Patented Jan. 27, 1953

2,626,936

UNITED STATES PATENT OFFICE 2,626,936

LINOLEUM SCRATCH COMPOSITIONS

Frank J. Hahn, Springfield, Mass., assignor to Monsanto Chemical Company, St. Louis, Mo., a corporation of Delaware No Drawing. Application September 12, 1950, Serial No. 184,520

15 Claims. (Cl. 260—17.4)

This invention relates to compositions suitable for floor coverings, wall tile and other molded extruded or calendered objects and to processes for preparing them. More particularly the invention relates to a linoleum "scratch" composition and to methods for preparing it.

Linoleum "scratch" is a moldable or calenderable composition comprising pigment, filler and a binding medium. The binding medium usually comprises a mixture of a drying oil gel and a synthetic or natural resin or in some cases a bituminous material such as asphalt. In the usual practice, the pigment, filler and binder are mixed together in malaxating apparatus to cause the binder to impregnate the filler and coat the pigments. Thereafter, the milled material is subjected to molding or calendering operations to form a sheet which is then laminated to a fibrous backing. One of the drawbacks to this process is the difficulty of obtaining a homogeneous mixture of binder, pigment and filler.

Attempts have been made to prepare the "scratch" in fluid media which permit more rapid and complete impregnation of the fillers and coating of the pigments. The use of organic liquids has proven expensive and somewhat perilous. Attempts to use water as the medium have hitherto failed, since the products proved to be water-sensitive and heterogeneous.

One object of this invention is to provide a moldable and calenderable floor covering and wall tile composition.

A further object is to provide an aqueous process for preparing a homogeneous composition which can be molded or calendered into a water-impervious floor covering and wall tile.

Another object of this invention is to provide a process for the preparation of linoleum "scratch."

These and other objects are attained by a process which involves the steps of (1) preparing an aqueous slurry of water-insoluble ingredients including pigments, extenders and a copolymer as hereinafter described, (2) converting the slurry into a pigment paste having dispersant properties, (3) emulsifying a binder in water using the pigment paste as the dispersing agent, (4) incorporating a filler into the emulsion resulting in the eventual breaking thereof and (5) drying the composition thus produced.

The following examples are given in illustration and are not intended as limitations on the scope of this invention. Where parts are mentioned they are parts by weight.

Example I

A slurry is prepared by stirring together 200 parts of asbestine extender, 50 parts of iron oxide pigment, 250 parts of water and 10 parts of a pulverulent copolymer of about 1 mol of styrene with about 1 mol of a half-ester of maleic acid in which the ester groups are a mixture of methyl and secondary butyl groups, the mol ratio of methyl groups to secondary butyl groups being substantially 1:3. As soon as the slurry is homogeneous, about 3 parts of ammonium hydroxide (28% ammonia) are stirred into the slurry resulting in the solubilization of the copolymer which then coats the asbestine and iron oxide particles. The product is an aqueous pigment paste having dispersant properties, i. e., it may be used to disperse the remainder of the ingredients of the moldable compositions in aqueous media.

Example II

To the pigment paste of Example I is added about 90 parts of a plasticizer such as butyl benzyl phthalate or a partially hydrogenated terphenyl. The plasticizer disperses quickly in the pigment paste with gentle stirring. Then 160 parts of an aqueous emulsion of polystyrene (50% solids by weight) are stirred into the paste resulting in an oil-in-water type emulsion in which the pigments, plasticizer and polystyrene are homogeneously mixed together in the oil phase. To this emulsion are gradually added with constant agitation 100 parts of wood flour. After all of the filler has been added to the emulsion, constant gentle stirring is continued until the emulsion "breaks" yielding a damp homogeneous mixture of fibrous filler, pigment, plasticizer and polystyrene. The water is removed from the mixture by drying at about 100° C. to provide a free-flowing granular mass which can be easily calendered or molded by compression or injection methods to produce sheets suitable for laminating to fibrous backings to produce floor coverings, wall tile, etc. For many purposes, such a backing is not needed and the molding operation produces a finished product. At no time during the process of this example is it necessary to resort to vigorous malaxation to homogenize the composition.

The wood flour in the example may be replaced by cork or fibrous fillers such as asbestos, nut shell flours, alpha flock, etc. The amount of filler may be varied to suit the particular product desired. Generally the ratio of filler to binder may vary between 50 and 1000 parts of filler per 100 parts of binder.

Example III

A paste is prepared by mixing together 200 parts of asbestine, 50 parts of titanium dioxide, 1 part of lampblack, 250 parts of water and 10 parts of a copolymer of styrene and a mixed methyl-secondary butyl half-ester of maleic acid followed by the addition of 5 parts of diethyl amine to solubilize the copolymer. Then, 170 parts of heavy blown linseed oil are stirred into the paste along with another 80 parts of water to produce an emulsion of linseed oil and pigment in water. To this emulsion, 250 parts of granulated cork are gradually added with constant though mild agitation. After all of the cork has been added gentle stirring is continued until the emulsion breaks yielding a damp granular mass. This mass is easily dried in a current of warm air to produce a fusible composition which can be molded or calendered into sheets or other articles. The calendered sheets are particularly suitable for use with a fibrous backing to produce a floor covering which is substantially impervious to water.

Example IV

A slurry is prepared by mixing together 100 parts of asbestine, 40 parts of titanium dioxide, 10 parts of raw sienna, 120 parts of water and 10 parts of a water-insoluble copolymer of styrene and a mixed methyl-secondary butyl half-ester of maleic acid. Three parts of ammonium hydroxide (28% ammonia) are stirred into the slurry to solubilize the copolymer and produce a pigment paste. To this paste is then added with stirring 380 parts of a 45% solids emulsion of a butadiene-styrene copolymer in which the styrene comprises about 60% by weight of the copolymer. The product is an emulsion of the copolymers and pigment in water. To this emulsion is added 80 parts of wood flour with constant but mild stirring. Shortly after the last of the wood flour is added the emulsion breaks yielding a damp granular mass which can be easily dried in a stream of warm air without fusing the resin. On drying, a free-flowing granular mass is obtained which is easily fabricated by conventional means into floor coverings, wall tiles, etc. which are substantially insensitive to water.

Example V

A slurry is prepared by mixing together 100 parts of asbestine, 50 parts of iron oxide pigment, 120 parts of water and 8 parts of a water-insoluble styrene-acrylic acid copolymer in which the mol ratio of styrene to acrylic acid is about 1:1. To this slurry is added 4 parts of ammonium hydroxide (28% ammonia) to solubilize the copolymer, coat the pigment particles and form a paste. To this paste are added with gentle stirring 380 parts of a 45% solids emulsion of a butadiene-styrene copolymer in which the styrene constitutes about 60% by weight. The emulsion thus produced is modified by the gradual addition with constant mild agitation of 150 parts of asbestos fibers. Stirring is continued after all of the fibers have been added until the emulsion breaks to yield a damp granular mass. This mass may be easily freed from water without fusing the butadiene-styrene copolymer. The dried mass may then be molded or calendered into articles or sheets suitable for laminating with fibrous backings to produce floor coverings and wall tiles which are substantially insensitive to water.

There are five essential steps in the process of this invention. In the first step, water-insoluble non-fusible materials such as pigments, extenders, lubricants etc. are slurried in water with a water-insoluble copolymer of a vinylidene compound and an alpha, beta unsaturated carboxylic acid or a half-ester thereof to obtain a thorough intermingling of the water-insoluble materials. For the best results, each of the materials introduced in the first step should be in particulate form.

In the second step, ammonia, morpholine or a volatile amine is added to the slurry in an amount sufficient to dissolve the copolymer. Upon dissolving, the copolymer coats the water-insoluble particles and a paste is produced which has excellent dispersant properties.

In the third step, a binder is added to the paste to obtain an emulsion containing from 40-60% solids. The binder may be a liquid resin or a siccative oil, or it may be a solid natural or synthetic resin, in which case it must be added in a liquid form either as a solution thereof in an organic solvent or as an emulsion or dispersion thereof in an inert liquid, preferably water. If modifiers for the binder are required, such as plasticizers, driers, etc., they may be added to the paste just prior to the addition of the binder or at the same time. This step involves the production of an aqueous emulsion either by emulsifying a plasticized liquid resin, a drying oil, a solution of a solid resin or a mixture thereof with the pigment paste as the dispersing medium or by blending an already formed emulsion or dispersion of drying oils, resins or mixtures thereof with the pigment paste.

One of the particular advantages of the third step is that it facilitates the plasticization of the resin. By first emulsifying the plasticizer with the pigment paste and then adding the resin in emulsion or solution form, the plasticizer is quickly and thoroughly dispersed throughout the resin.

The fourth step comprises the addition to the emulsion of a filler which may be granulated cork or a fibrous material. The filler is added to lend strength, toughness and resiliency to the composition. The filler should be added gradually with stirring and the agitation should be continued after all of the filler is added. The filler gradually absorbs the emulsion and causes it to break producing a damp homogeneous granular mass.

The fifth step is the removal of the water from the product by a stream of hot gas, oven drying or other conventional procedure to produce a dry free-flowing granular material. In this step, the ammonia, morpholine or amine is volatilized.

The free-flowing dry granular material may then be molded, extruded or calendered into sheets, rods, tubes, and other similar articles. For the production of floor-covering and wall tile, sheets are generally prepared on a multiroll calender and then are laminated to a fibrous backing such as burlap or canvas. The moldings and laminates are substantially impervious to water and are surprisingly resistant to alkalies.

Various pigments and extenders may be used depending on the color, depth of color, extent of capacity, etc. desired in the finished product. The pigments may be organic or inorganic and may be water-insoluble per se or through the precipitation thereof on lake forming compositions such as phospho-tungstate, aluminum hydroxide, etc. mordants. The extenders, where used, are considered a part of the pigment portion of the compositions.

The binders which may be used are siccative oils, liquid resins, and solid resins in a fluid medium i. e., dissolved in an organic solvent medium or dispersed in an aqueous emulsion. Mixtures of drying oils and resins may be used. The binders must be insoluble in water.

Among the oils which may be used are linseed, tung, oiticica, perilla, soya bean, sunflower seed, poppy seed, etc. oils. For the preparation of linoleum and other floor coverings, it is often desirable to blow the oils until they become a very viscous liquid or a soft gel before adding them to the pigment pastes. If desired, metallic driers such as cobalt and manganese naphthenates may be added along with the oils. Furthermore, it is often desirable to modify the oil by adding a natural or synthetic resin to the composition. This may be done in the third step of the process.

Resinous binders may be any of the natural or synthetic resins which are insoluble in water and which are either permanently fusible or have a fusible stage in which they are either soluble in organic solvents or dispersible in water. Among the resins which may be used are natural resins such as rosin, shellac, copal, cumar, kauri, dammar, asphalt, petroleum still residues and other bituminous fractions, etc., and synthetic resins such as alkyd resins and variations thereof such as drying oil modified alkyd resins, phenol-aldehyde resins, melamine-aldehyde resins and the ether modifications thereof, urea-aldehyde resins and the ether modifications thereof, and polymers and copolymers of unsaturated organic compounds. For some purposes, it is preferred to use resins which are oxidizable, e. g., the drying oil gels, drying oil modified alkyd resins, petroleum still residues containing residual unsaturation, etc. Among the polymers and copolymers, it is preferred to use the polymerization products of compounds having a single ethylenic double bond or a system of conjugated double bonds. Particularly desirable are the polymers of styrene, alpha alkyl styrenes or ring-substituted styrenes and the copolymers thereof with other vinylidene compounds and with conjugated dienes and the polymers and copolymers of vinyl chloride. Butadiene-styrene copolymers in which the styrene constitutes at least 50% of the copolymer provide a particularly resilient and tough floor covering.

The fourth step of the process of this invention is extremely important. It consists of stirring into the previously prepared emulsions or dispersions granulated cork or a fibrous filler. The additive serves to increase the strength, toughness and resiliency of the final composition and can be so chosen as to impart a warm texture to wall tiles. The withholding of the additive until the final phase eliminates the necessity of using large amounts of emulsifying agents and makes it possible to use mild agitation throughout the process. It has further been found that the gradual addition of the cork or filler with constant mild stirring results in a thorough impregnation of the cork or fibers with the binders and pigments and eventually results in the breaking of the emulsion. On breaking of the emulsion, a damp granular mass is obtained which may be easily and quickly freed from water by conventional methods such as oven drying, passing a stream of warm inert gas through the mass, etc. without setting up the thermosetting binders or fusing the thermoplastic binders. The dried mass retains its granular characteristics and is free flowing. In this condition the product is quite easily handled in any of the usual molding and calendering operations used in preparing floor coverings, wall tiles etc.

One of the essential features of this invention is the addition to the pigment slurry of water-insoluble copolymers of vinylidene compounds with alpha, beta ethylenically unsaturated acids or the partial derivatives thereof. In preparing the copolymers, there may be used such vinylidene compounds as vinyl esters including vinyl acetate, vinyl butyrate, vinyl stearate, vinyl ethers including vinyl methyl ether, vinyl isobutyl ether, etc., vinyl halides including vinyl chloride, vinyl fluoride, etc., vinylidene halides such as vinylidene chloride, 1,1-fluoro chloro ethylene, etc., and aromatic hydrocarbons having a side chain containing a polymerizable double bond including styrene, ring-substituted styrenes, alpha alkyl styrenes e. g., alpha methyl styrene and alpha alkyl styrenes which are also substituted in the ring, e. g., alpha methyl para methyl styrene. The alpha, beta ethylenically unsaturated acid component of the copolymer may be acrylic acid or an alpha substituted acrylic acid such as ethacrylic acid, methacrylic acid, atropic acid, etc., or it may be a butenedioic acid or a half-ester thereof such as maleic, fumaric, mesaconic, itaconic, citraconic, etc., acids and their half-esters. The mol ratio of vinylidene compound to unsaturated acid is generally substantially 1:1. Particularly useful are the copolymers of styrene with half-esters of maleic acid in which the ester groups are a mixture of methyl and secondary butyl groups. The mol ratio of methyl groups to secondary butyl groups may be varied from 1:1 to 1:8. These copolymers are insoluble in water. They are normally incompartible with drying oils and natural and synthetic resins except when they are incorporated into the resins in the form of their ammonia, morpholine or volatile amine salts. They maintain this compatability even after the volatile salt-forming compound has been driven off. The ammonia, morpholine and volatile amine salts of the specific copolymer of the examples in which the mol ratio of methyl groups to secondary butyl groups is substantially 1:3 have a particularly wide range of compatibility with drying oils and resins. Since this specific copolymer is quite hard, it adds a desirable stiffness to the compositions of this invention.

The water-insoluble copolymers may be solubilized by forming salts thereof with alkalies. However, if fixed alkalies are used, the products obtained are quite sensitive to water and the modifying effect of the copolymer on the binder is lost. To obtain the products of this invention, the copolymers are solubilized with ammonia, morpholine, or a primary, secondary or tertiary alkyl amine in which the alkyl groups contain from 1 to 3 carbon atoms. The amount of solubilizing compound must be at least stoichiometrically equivalent to the copolymer. If desired, a slight excess of the ammonia, morpholine or amine may be used since it is volatilized from the compositions in the last stages of their preparation, i. e., the drying and molding operations. Strangely enough, after the molding or calendering operation is completed, the copolymers are no longer soluble in alkaline materials and immersion of the molded composition in 50% sodium hydroxide does no more than slightly swell the molded objects.

For most efficient operation it is preferred to add the insoluble copolymer in pulverulent form to the pigments and extenders in a small amount of water to form a slurry of the insoluble materials. This permits the thorough intermingling of the particulate solids prior to the solubilizing of the copolymer. Then, upon adding the ammonia, morpholine or amine, the soluble salt of the copolymer quickly and completely coats and impregnates the pigments and extenders to form a paste. Quite unexpectedly it was discovered that pastes formed in this manner are much more efficient as emulsifying agents than are the solubilized copolymers alone. For example, attempts to emulsify plasticizers in water with an ammonium salt of the styrene-maleic half-ester meet with failure unless extremely large amounts of the dispersing agent are used or unless extremely vigorous agitation such as obtained in a colloid mill is used.

After the binder has been dispersed or emulsified with the pigment pastes, it is desirable to break the emulsion in such a way that the water may be easily removed and without adding a coagulant that will have a harmful effect on the properties of the final composition. This is accomplished by withholding the granulated cork or fibrous filler until the binder has been homogeneously dispersed and mixed with the pigments, plasticizer, etc. The cork or fibrous filler is added gradually with constant agitation. As it is added, it becomes impregnated with the binder composition including the solubilized copolymer until the emulsion breaks producing a granular damp mass. In this form, the water may be easily removed without affecting the binder.

In preparing the compositions of this invention, care must be taken to limit the total amount of water so that the emulsion obtained at the end of the third step contains from 30–50% water by weight and correspondingly from 75–50% solids i. e., pigment and binder. In calculating the amount of binder, any plasticizer used is to be considered a part of the binder.

A particular advantage of this invention is that the moldable compositions are obtained with a minimum of mechanical work, i. e., mild agitation such as is obtained in a pony mixer or a dough mixer is all that is necessary throughout the process. Expensive machinery, which operates at high rates of shear and requires large amounts of power such as colloid mills, is not necessary in this process.

A further advantage is that the molded compositions are not sensitive to water even though a dispersing agent has been used in their preparation. Even more important is their resistance to mild alkali which makes it possible to wash the molded products repeatedly with soap and other detergents without harming the moldings.

It is obvious that variations may be made in the products and processes of this invention without departing from the spirit and scope thereof as defined in the appended claims.

What is claimed is:

1. A process as in claim 15 wherein the copolymer is a copolymer of styrene and acrylic acid in which the mol ratio of styrene to acrylic acid is 1:1.

2. A process as in claim 1 wherein the solubilizing compound is ammonia.

3. A process as in claim 15 wherein the copolymer is a copolymer of styrene and a mixed methyl-secondary butyl half-ester of maleic acid in which the mol ratio of styrene to half-ester is substantially 1:1 and the mol ratio of methyl groups to secondary butyl groups is substantially 1:3.

4. A process as in claim 3 wherein the solubilizing compound is ammonia.

5. A process as in claim 3 wherein the solubilizing compound is morpholine.

6. A process as in claim 3 wherein the solubilizing compound is diethylamine.

7. A process as in claim 3 wherein the binder is heavy blown linseed oil.

8. A process as in claim 3 wherein the binder is polystyrene.

9. A process as in claim 3 wherein the binder is a copolymer of butadiene and styrene in which the styrene constitutes 60% by weight of the copolymer.

10. A composition as in claim 14 wherein the binder is a siccative oil.

11. A composition as in claim 14 wherein the binder is a heavy blown linseed oil.

12. A composition as in claim 14 wherein the binder is polystyrene.

13. A composition as in claim 14 wherein the binder is a copolymer of styrene and butadiene in which the styrene constitutes 60% by weight of the copolymer.

14. A moldable composition comprising water-insoluble pigments, a water-insoluble copolymer of styrene and a mixed methyl-secondary butyl half ester of maleic acid in which the mol ratio of styrene to half ester is substantially 1:1 and the mol ratio of methyl groups to secondary butyl groups is substantially 1:3, a binder taken from the group consisting of siccative oils, natural resins and water-insoluble synthetic resins, and a water-insoluble natural fibrous filler, said composition being a free-flowing dry granular material.

15. A process for preparing a moldable composition which comprises the steps of 1) slurrying water-insoluble pigments in water with a pulverulent water-insoluble copolymer of a monovinylidene compound taken from the group consisting of vinyl esters, vinyl ethers, vinyl halides, vinylidene halides and aromatic hydrocarbons having a side-chain containing a polymerizable double bond, the vinylidene group of said compounds being the sole non-benzenoid unsaturation in the compounds and a compound taken from the group consisting of alpha, beta ethylenically unsaturated monocarboxylic acids, alpha, beta ethylenically unsaturated dicarboxylic acids and half-esters of saturated alcohols and alpha, beta ethylenically unsaturated dicarboxylic acids, 2) forming a pigment paste by adding a compound taken from the group consisting of ammonia, morpholine and primary, secondary and tertiary alkyl amines containing from 1 to 3 carbon atoms in the alkyl groups to the slurry in an amount at least stoichiometrically equivalent to the copolymer, 3) forming an aqueous emulsion of a binder taken from the group consisting of siccative oils and water-insoluble natural and synthetic resins by mixing the binder with the pigment paste under conditions of mild agitation, said emulsion containing from 30–50% by weight of water, 4) adding a water-insoluble natural fibrous filler to the emulsion thus formed with constant agitation until the emulsion breaks, and 5) drying the wet granular mass thus produced without activating the binder.

FRANK J. HAHN.

REFERENCES CITED

The following references are of record in the file of this patent:

UNITED STATES PATENTS

| Number | Name | Date |
|---|---|---|
| 2,470,329 | Barkhuff | May 17, 1949 |
| 2,490,677 | Cupery | Dec. 6, 1949 |

FOREIGN PATENTS

| Number | Country | Date |
|---|---|---|
| 459,736 | Canada | Sept. 13, 1949 |
| 703,303 | Germany | Mar. 6, 1941 |
| 957,005 | France | Aug. 15, 1949 |